Patented Aug. 15, 1944

2,355,822

UNITED STATES PATENT OFFICE 2,355,822

FILTER MEDIUM

Edward W. Rugeley, Charleston, W. Va., assignor to Carbide and Carbon Chemicals Corporation, a corporation of New York No Drawing. Application November 2, 1938, Serial No. 238,337

5 Claims. (Cl. 210—204)

This invention is directed to a new kind of filter medium having wide industrial application.

In the filtration of fluids the choice of the filter medium, or material through which the fluid is passed in order to remove suspended matter, depends largely upon the material to be filtered and the liquid in which it is suspended. A satisfactory filter medium must have good mechanical strength, resiliency and resistance to deterioration under the conditions of use. In addition, it must be substantially impervious to the suspended matter while at the same time permitting the fluid to pass quite easily.

Fabric filter media are usually made of cotton or wool. As cotton is the cheaper and may be used for a variety of products, it is more often chosen; but wool cloths are more suitable than cotton for the filtering of acid solutions. On the other hand, alkalis and strong acids destroy both wool and cotton, so that for such liquids special metal cloths have been made. However, the fabrication of fine metal screens is difficult and exceedingly costly.

Although many attempts have been made to render cotton cloths resistant to the action of acids, alkalis and molds, as by impregnation with copper sulfate or partial nitration, and although cloths have been made from artificially spun threads of cellulose derivatives, such as the acetate, no such cloth has been devised which did not either fail to overcome completely the obstacles or problems attacked, or introduce new ones. For example, the cellulose derivatives are not resistant to strong acid and alkali, certain molds, and the partially nitrated cotton fabrics are, in addition, quite inflammable and prove to be unstable. Filtering media made of glass filaments are chemically resistant to nearly all fluids which are not strongly alkaline, but the fibers will not stand compressive or shearing stresses and, when used in filter presses, the material fractures upon compressing the filter plates sufficiently to prevent leakage. In addition, it is very difficult to control the porosity of glass fiber filters.

This invention provides a filter medium, suitable for use in filtration apparatus of the usual types, such as the filtration presses mentioned, which filter medium, may have very high strength by comparison with other fibrous filter media, and is unusual in that its strength is virtually the same whether wet or dry. If anything, the wet strength is slightly greater than the dry strength. The fibers of which this filter medium are made have high true elasticity, flexibility, remarkable resistance to both acid and alkaline solutions and hydrocarbons, and are immune to bacterial or fungal attack. They are, in addition, fire resistant, for although they will burn when brought in contact with a flame, they will not support combustion when the flame is removed. A distinctive property of these fibers makes it possible in the case of fabrics or filter cloths made of these fibers, to reduce the porosity of the fabric as desired, by a process of controllable shrinkage, to a degree so fine that the material may be employed as anode bags for use in electrolytic processes, or dialyzing membranes, and the like.

The invention also includes the processes of filtering, dialyzing, and the like wherein the materials to be described are employed as the filtering media.

The filter medium may consist essentially of woven, knitted or matted filaments or fibers prepared from vinyl resins having especial characteristics. The resins should have average macromolecular weights of at least 10,000, and where the fibers must have a high strength, the macromolecular weight should be at least 15,000, while the upper value is limited only by the solubility of the resins in suitable liquids to yield spinnable solutions or dispersions. Molecular weights referred to herein are those calculated by means of Staudinger's formula from viscosity determinations of solutions of the resin. Vinyl resins, as ordinarily prepared, normally consist of a mixture of polymeric aggregates of different molecular sizes. Those to be used in the fabrication of very strong fibers for the filter materials of the invention may be freed from polymers having excessively low molecular weights in order that the average macromolecular weight of the resin will be at least the minimum stated above. This may be accomplished by various extraction procedures, such as those described in Patent 1,990,685 to C. O. Young and S. D. Douglas, or by similar methods of partial dissolution and precipitation.

Although filter media of this invention may be made from any of the vinyl resins having the macromolecular weights described above, the strongest and most durable filter media are made from the vinyl ester resins, especially those such as are described in Patent 1,935,577 to E. W. Reid, and these resins may be made by the processes described by that patent or by other means, such as the process described in Patent 2,064,565 to E. W. Reid. Of these resins, which are known as conjoint polymers of vinyl halides with vinyl esters of aliphatic acids, the preferred resins are those which contain from 80% to 95% by weight of the halide in the polymer. Within this range, those resins formed from vinyl chloride and vinyl acetate which contain in the polymer about 85% to 90% by weight of the vinyl chloride are the most desirable.

The resin, if treated as described above, should be completely dispersible in some liquid from which the filaments may be formed in the spinning operation. In general, the vinyl ester resin may be dispersed satisfactorily in warm dry acetone. By "dry" acetone is meant this substance which contains less than about 0.60% by weight of water. The concentration of the vinyl resin in the spinning solution is dependent upon and varies inversely with the macromolecular weight of the resin, but the resin content ordinarily employed using acetone as the solvent is 25% or less by weight.

The spinning, or filament extrusion, operation may be carried out in equipment customarily employed for so-called "dry-spinning" of other types of textile filaments. A bobbin-type thread take-up may be employed, or the filaments may be given a twist at the point of spinning by employing a "cap-type" mechanism. The filaments or thread delivered from the take-up bobbin may be twisted, or doubled and twisted, to form a yarn. Unless a special treatment is applied, it is necessary in most cases to permit the freshly-extruded filaments to age for at least 12 hours before the twisting and doubling operations are performed, but aging of the filaments can be advantageously accelerated or replaced by a more brief treatment with heated water. For example, if the filaments on the bobbins are immersed in water at 65° C. for a period of 2 to 5 hours, no further aging is required.

The next step in the yarn processing is that of stretching. The importance of this step is in direct proportion to the strength desired in the finished articles. Also, in cases where the fabric is to be used as a dialyzing membrane, or some similar process requiring a material of ultrafine porosity, the stretching of the yarn is of paramount importance, for it is by heating the finished fabric to about the softening temperature of the resin, with a consequent release of the strains developed in the stretching operation, that the shrinkage is obtained. Although the amount of shrinkage is dependent to a certain extent upon the amount of stretch imparted to the yarn, the most practical method for accurately controlling the degree of shrinkage of the fabric (and hence its porosity) is by regulation of the temperature to which the fabric is heated and the time of exposure to that temperature.

The amount of stretch imparted to the yarn may vary considerably up to about 200%, and in normal procedure a stretch of about 75% to about 180% is applied. The extent of the stretch used is determined by the polymer size (average macromolecular weight) of the resin, and by the characteristics desired in the finished fabric. It is important to conduct this operation while the yarn is adequately surface-wetted, and this may be done by immersing the spools from which the yarn is to be stretched in water which may contain a wetting agent or surface tension depressant, such as a sodium salt of a higher alkyl sulfate, or another of the materials commonly used for this purpose in textile operations. It may be desirable to apply the stretch in two or more stages. Thus, the yarn may be initially stretched, say, 90%, and in two subsequent operations given additional stretching to the extent of 10% or 20% in each stage.

For a period after the yarn has been stretched, it shows a marked tendency to contract. This characteristic may be readily controlled and modified by a "setting" treatment, for example, by prolonged aging of the yarn under tension, or by subjecting the yarn under tension to moderately elevated temperatures, which greatly accelerate the rate of setting. Irregularities in the softness or "feel" of the yarn may be eliminated, if desired, by subjecting the yarn to abrupt flexing at high speeds while immersed in water. Such flexing can easily be carried out by simply transferring the yarn from one bobbin to another by way of an intermediate roller or set of rollers operating under water and arranged to cause the yarn passing over them to change direction through a short radius one or more times.

The process of producing the yarn suitable for use in this invention is disclosed in Patent No. 2,161,766, issued June 6, 1939 to E. W. Rugeley, T. A. Feild and J. F. Conlon, with which this application contains material in common.

Although the foregoing description is primarily directed to the production of filter fabrics woven from textile fibers of continuous filaments, it is also possible to apply these procedures to the formation of filter fabrics from staple fibers, or artificial wool-like masses. The filaments may be used in this manner either in the stretched or unstretched condition, and the shorter filaments or staple fibers are particularly useful in conjunction with other types of natural or artificial textile fibers, for the fabrication of filter cloths where the materials to be filtered will not damage natural or other types of artificial fibers.

For special types of filtering, particularly the removal of dust particles from gases, it is often desirable to employ a loose matted filter medium, or unpressed quantities of fiber masses, rather than a woven fabric. For such materials, the vinyl resin staple fiber, either stretched or unstretched, is particularly suitable, either alone or in admixture with natural or other artificial fibers. Such matted filter media may be given an appreciable amount of stiffness by heating the matting until a partial fusion of the fibers takes place. This partial fusion does not reduce the porosity of the material to any appreciable extent if the fibers have not been greatly stretched, but tends to stabilize the porosity by resisting to a certain extent the compressive forces which, during use, tend to pack the fibers together. In filtering fairly dry gases, the vinyl resin fibers, like glass, will often acquire an electrical charge which helps in the removal of suspended particles. On the other hand, these fibers are unlike wool or cotton in that they do not absorb appreciable quantities of water and become packed. There is very little change in the impedance to the gas flow as the humidity of the gas increases.

As specific examples of successful applications of the filter cloths made in accordance with this invention, there may be mentioned the filtration of lime sludges, zinc pigments and sludges from electrolytic refining processes (including the use of anode bags made of these fabrics in connection with electrolytic refining apparatus) and in the dialysis of caustic alkali solutions. A comparative test of mold resistance of these filter cloths consisted in burying a sample in damp soil along with a piece of cotton duck. After two months the cotton fabric had completely disintegrated, while there was no evidence of deterioration of the vinyl resin cloth. The piece was then buried again with fresh cotton duck for three months and, like the first trial, the cotton was completely destroyed. No signs of deterioration of the vinyl resin cloth could be detected.

The synthetic fibers made from the described vinyl resins may be woven into filter cloths in any of the usual ways, and the most satisfactory fabrics are woven (as is usual for ordinary fibers) in duck, twill, or chain weaves, depending on the uses intended. If the fibers are matted to produce a loose or fluffy filter medium, the matting so produced may be supported on one or both sides by the vinyl resin cloth, the material in this form being known as batting. Where desired, the matting may be interposed between several layers of cloth to form a laminated filter medium. The loose fibers may be held between the cloth by stitching, or layers of the cloth alone may be sewn with a thread made of the vinyl fibers. On the other hand, the thermoplasticity of the fibers may be taken advantage of to make the loosely matted fibers adhere to the cloth, where stitching, or other means of fastening, is unsuitable.

Many special uses and adaptations of the materials of this invention will be apparent to those skilled in the art. The procedures by which the new filter media are formed can be varied in many of their details, and such modifications are included within the invention as defined by the appended claims.

The term "filaments" is used in the claims to designate both continuous filaments and staple fibers made therefrom.

I claim:

1. A filter medium comprising filaments of a vinyl resin resulting from the conjoint polymerization of a vinyl halide with a vinyl ester of an aliphatic acid, which contains from about 80% to about 95% by weight of the halide in the polymer and which has an average macromolecular weight of at least 15,000, said filaments having been partially fused to add stiffness to the filter medium and to stabilize the porosity of the latter.

2. A filter medium consisting of matted fibers supported on at least one side by a cloth, said fibers and the fibers of said cloth comprising filaments of a vinyl resin resulting from the conjoint polymerization of a vinyl halide with a vinyl ester of an aliphatic acid, which contains from about 80% to about 95% by weight of the halide in the polymer and which has a macromolecular weight of at least 15,000.

3. As a dialyzing membrane, a fabric comprising yarn formed of filaments of a vinyl resin resulting from the conjoint polymerization of a vinyl halide with a vinyl ester of an aliphatic acid, which contains from about 80% to about 95% by weight of the halide in the polymer and which has an average macromolecular weight of at least 15,000, said filaments having been stretched between about 75% and about 200%, and said fabric having been heated to near the softening point of the vinyl resin, thereby releasing strains developed in the stretching operation and shrinking the fabric to produce a material of ultra-fine porosity.

4. An electrolytic anode bag which is permeable to a fluid electrolyte but is capable of removing particles from such fluid passing therethrough, said anode bag comprising a filter fabric containing yarn formed of stretched fibers of a vinyl resin resulting from the conjoint polymerization of a vinyl halide with a vinyl ester of an aliphatic acid, which contains from about 80% to about 95% by weight of the halide in the polymer and which has an average macromolecular weight of at least 15,000, said fabric having been heated to near the softening point of the vinyl resin, thereby at least partially releasing the strains developed in the stretching of the fibers and shrinking the fabric for reducing its porosity.

5. An electrolytic anode bag comprising fabric containing yarn formed of stretched fibers of a vinyl resin resulting from the conjoint polymerization of a vinyl halide with a vinyl ester of an aliphatic acid, which contains from about 80% to about 95% by weight of the halide in the polymer and which has an average macromolecular weight of at least 15,000, said fibers having been stretched between about 75% and about 200%, and said fabric having been heated to near the softening point of said vinyl resin, thereby at least partially releasing the strains developed during the stretching of the fibers and shrinking the fabric for reducing its porosity.

EDWARD W. RUGELEY.